July 6, 1926.

D. C. PRINCE 1,591,434

SYSTEM OF MOTOR CONTROL

Filed July 23, 1925

Inventor:
David C. Prince,
by *Alexander F. Lunt*
His Attorney.

Patented July 6, 1926.

1,591,434

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

SYSTEM OF MOTOR CONTROL.

Application filed July 23, 1925. Serial No. 45,675.

My invention relates to improvements in systems of motor control and in particular to systems for automatically maintaining a predetermined relation between the speeds of a plurality of separate driving motors.

A segregated drive for a paper making machine, for example, presents difficulties in the accurate maintenance of the desired speed relation of the separate driving motors, since it is required that the motors operate practically as if they were mechanically connected to each other, and the requirements are further that the speed relation shall be readily adjustable while the machine is operating. Although not necessarily limited thereto, my invention is particularly applicable to such segregated drives and the invention has for one of its objects the provision of a simple, effective and inexpensive arrangement employing thermionic means such as thermionic valves for controlling the speed relation of the motors, together with an arrangement whereby the speed relation may be very readily adjusted and automatically maintained in the adjusted relation.

In carrying the invention into effect in the form which I now regard as the preferred form, the speed of each of the driving motors is compared with the speed of a second motor which operates at a substantially constant speed, thermionic valves being electrically connected with the respective driving motors and these valves being under the control of the constant speed motor as well as influenced electrically by the respective driving motors. Speed regulating means is provided for the separate driving motors and the speed regulating means for each motor is under the control of thermionic means associated with that driving motor. A plurality of thermionic valves are employed, and these valves are electrically connected with their associated driving motor and are controlled by the constant speed motor so as to respond to the angular displacement or phase difference between the driving motor and the constant speed motor when there is a tendency to departure from the predetermined speed relation of the motors. This response of the thermionic valves is employed to regulate the speed of the associated driving motor so that the tendency of the driving motor to depart from the predetermined speed relation is corrected almost instantly so that the driving motors operate substantially as if they were mechanically connected to each other.

Figure 1:
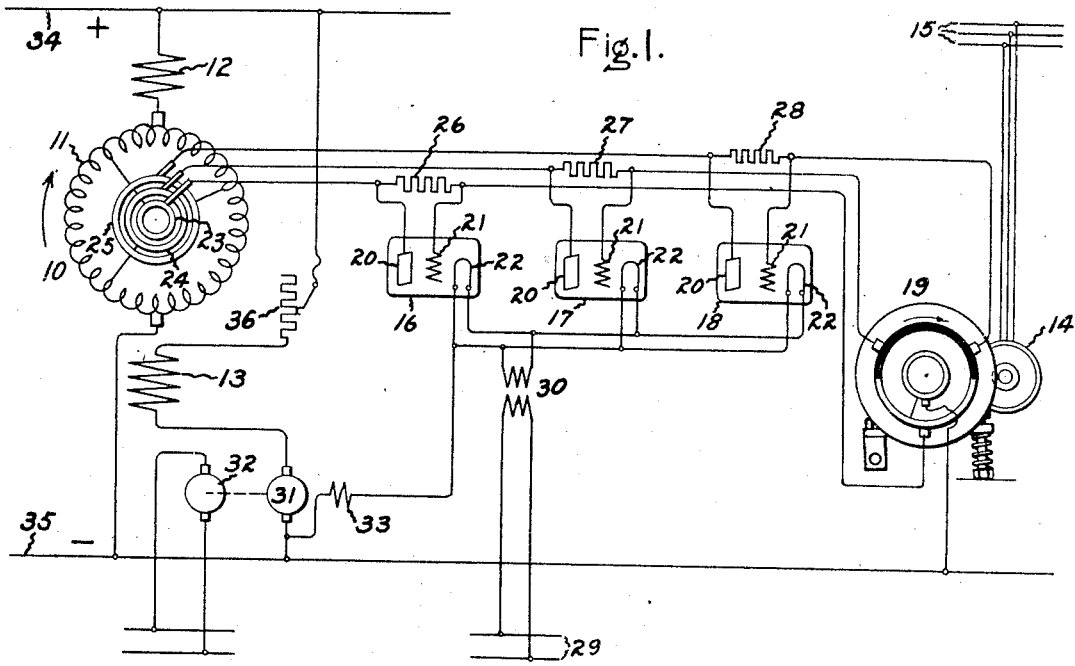
Figure 2:
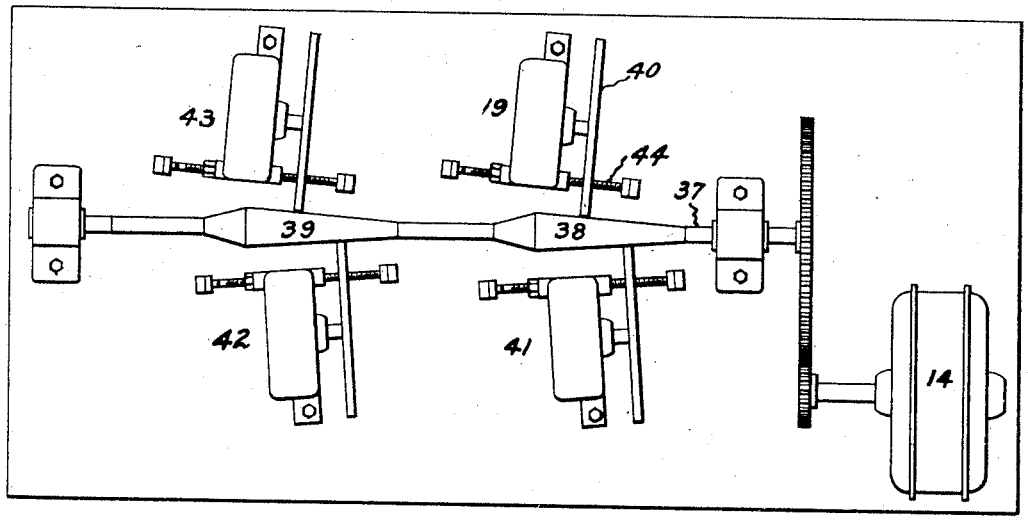
Figure 3:
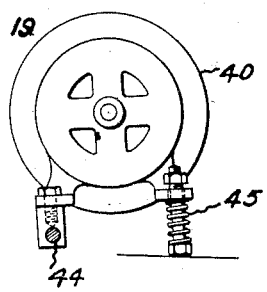
Figure 4:
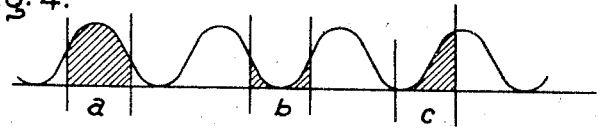

For a better understanding of the invention reference is had in the accompanying drawing, in which Fig. 1 is a very diagrammatic showing of a driving motor, the constant speed motor with which the driving motor speed is compared, the thermionic valves electrically connected with the driving motor and controlled by the constant speed motor, and the speed regulating means for the driving motor connected to be under the control of the thermionic valves. Fig. 2 is a plan view of the constant speed motor, and adjustable contact devices driven thereby, each contact device being driven through an adjustable connection with a shaft driven by the constant speed motor, and each contact device being intended for the control of a separate driving motor so that the separate driving motors of the paper machine are all interconnected through a common control. Fig. 3 is a detail of the arrangement of Fig. 2, showing the method of mounting the contact mechanism so as to be adjusted with reference to the common shaft driven by the constant speed motor. And Fig. 4 is a graphic representation of the effect of the thermionic valves and the control of these valves, which is had by means of the contact device driven by the constant speed motor.

Referring to the drawings, particularly Fig. 1, wherein a single motor with its control is shown, the separate driving motor 10 of a paper machine or the like is indicated as of the direct current type having an armature 11, a series field 12 and a separately excited speed regulating field 13. The speed of the motor 10 is compared with the speed of the constant speed motor 14 through the arrangement which will be presently described. The motor 14 is shown as of the alternating current type supplied with energy from the three phase source of supply 15, although the invention is not necessarily limited to an alternating current substantially constant speed motor, since, as will be presently described, any suitable motor may be provided for this purpose provided the motor maintains a fairly constant speed.

The thermionic valves 16, 17, and 18 are electrically connected with the armature of the driving motor 10, and these valves are under the control of a contact device 19 driven by the constant speed motor 14. The valves are indicated as of the pliotron type having a plate 20, a grid 21, and a hot cathode or filament 22. The valve 16 is connected with the slip ring 23, the valve 17 is connected with the slip ring 24, and the valve 18 is connected with the slip ring 25, these slip rings being connected to the armature conductor of the driving motor 10 in such a manner that there is a substantially equal phase angle difference between the slip rings. In other words, in the particular arrangement shown, the voltages on the slip rings are 120 degrees displaced with reference to each other, the currents through the slip rings being pulsating in character.

Interposed between the plate and grid of the pliotron 16 is a comparatively high resistance 26. Similar comparatively high and substantially equal resistances 27 and 28 are interposed between the plates and grids of the valves 17 and 18. These resistances 26, 27, and 28 are of comparatively very high values and are provided to obtain a biasing effect of the grid with reference to the plate and to prevent a short circuiting of the slip rings by the contact device. The filaments of the pliotrons are all supplied from a suitable alternating current source of supply 29 through the step down transformer 30.

The speed regulating means for the driving motor 10 includes the generator 31 which is driven by the motor 32. The field 33 of the generator 31 is controlled by the pliotrons 16, 17, and 18 and the voltage of the generator 31 is thus correspondingly varied. Varying the energization of the generator 31 effects a variation of the speed regulating winding 13 of the motor 10 so as to restore the predetermined relation between the speed of the motor 10 and the constant speed motor 14.

As thus constructed and arranged and with the parts in their respective positions indicated in Fig. 1, the operation of my invention is as follows. It will be assumed that the direct current driving motor 10 for a unit of the paper making machine or the like is in operation and is being supplied with energy from the direct current source of supply 34, 35. The adjustable rheostat 36 in the circuit of the shunt field 13 of motor 10 will be adjusted to give the desired speed of the motor 10 and to adjust the speed of this motor with respect to the other separate driving motors of the paper making machine or the like. A pulsating voltage as indicated in Fig. 4 will be supplied to the slip rings 23, 24, and 25 by the generator action of motor 10 and this voltage will be impressed on the thermionic valves 16, 17, and 18. The contact device 19 will be rotated by the substantially constant speed motor 14 to periodically interrupt the flow of energy through the respective valves and through the controlling field coil 33 of the generator 31.

In the position indicated in Fig. 1, since the slip ring 23 of the motor 10 is connected through the segment of the contact device 19 to the conductor 35, the plate 20 and the grid 21 of the pliotron 16 will be at different potentials and the effect is substantially the same as if the grid 21 is connected to the filament 22. The passage of current through the pliotron 16 will be substantially quenched, but there will be a passage of current through the pliotrons 17 and 18 resulting in a resultant current value which passes from the conductor 34, through the armature winding of the motor 10, the slip rings 24 and 25, pliotrons 17 and 18, through the field winding 33 of the generator 31 to the supply conductor 35, the motor 10 operating somewhat as an alternating current generator so far as this feature of the operation is concerned. Assume that the contact device 19 is rotated in the clockwise direction as indicated by the arrow, the passage of current through the pliotron 17 will next be quenched and the passage of current through the pliotron 16 will be resumed. Further rotation of the contact device 19 will cause the passage of current through the pliotron 18 to be quenched and thus the passage of current through the pliotrons is periodically quenched and resumed.

The value of the resultant current in the field winding 33 of the generator 31 will be determined by the generated voltage of the motor 10. This voltage is represented graphically in Fig. 4, and it is obvious that the currents which are passed through the pliotrons will vary over a considerable range depending on the phase relation of the contact device 19 with respect to the motor 10, since this change in phase causes the disconnection of the grids of the pliotrons from the filament potential at different times, as indicated by $a$, $b$, and $c$. Since the filaments of the pliotrons are connected together, the currents passed through the pliotrons are thus combined for use in the generator field 33. It is obvious that varying the energization of the generator field 33 will vary the potential generated by the generator 31 and thus in turn vary the current flowing through the field 13 of the motor 10. This will effect a very rapid change in the speed of the motor 10 in response to a tendency to departure from the predetermined speed relation of the motor 10 with reference to the constant speed motor 14, and this in turn with reference to the speeds of all of the other separate driving motors for the paper making machine or the like.

Referring to Fig. 2, it will be seen that I have provided a plurality of contact devices similar to the contact device 19 indicated in Fig. 1. These contact devices are substantially identical and each is intended for the control of a separate driving motor in a system such as indicated in Fig. 1. The constant speed motor 14 drives the shaft 37 through reduction gearing as indicated, and this shaft has two taper portions 38 and 39 which provide a means whereby the speeds of the various contact devices may be adjusted with reference to each other. Thus by sliding the friction wheel 40 of the contact device 19 along the taper of the shaft 37, the speed of the motor 10 may be adjusted with reference to the speeds of the separate motors controlled by the other contact devices 41, 42, and 43.

In Fig. 3 I have indicated an arrangement whereby this adjustment of the contact device may be readily had. The contact device is mounted on an adjusting screw 44 and the contact wheel 40 is resiliently held in engagement with the tapered surface 38 of the shaft 37 by means of the spring 45. This provides a very convenient method of adjusting the speed of the driving motor 10 with reference to the constant speed motor 14 and thus in turn adjusting the speed of this motor with reference to the speeds of the driving motors controlled by the other contact devices 41, 42, and 43. It will be obvious that the invention is not necessarily limited to any particular number of separate driving motors which are controlled in accordance with the invention, since by extending the arrangement shown in Fig. 2, any desired number of machines may be simultaneously controlled, each driving motor being controlled by means of a system such as indicated in Fig. 1.

What I claim as new and desire to secure by Letters Patent of the United States, is,—

1. Means for maintaining a predetermined speed relation between an electric motor and a second motor, comprising speed regulating means for said electric motor, thermionic means electrically connected with said electric motor and controlled by said second motor to respond to the phase difference between said motors when there is a tendency to departure from the predetermined speed relation of the motors, and electrical connections through which said thermionic means controls said speed regulating means to correct the said tendency to depart from said predetermined speed relation.

2. In a speed control system, an electric motor whose speed is apt to vary, a device operated at a substantially constant speed, speed regulating means for said motor, thermionic means electrically connected with said motor and controlled by said constant speed device to respond to the phase difference between said motor and said constant speed device when there is a tendency of the speed of said motor to depart from a predetermined speed relation between said motor and said device, and connections through which the said thermionic means controls said speed regulating means to correct the said tendency to depart from said predetermined speed relation.

3. In a speed control system, a direct current electric motor whose speed is apt to vary, speed regulating means for said motor, a thermionic valve electrically connected to be influenced by the voltage generated in the armature of said motor, a contact device operated at a substantially constant speed for controlling the energy which passes through said valve, and electrical connections through which the energy passing through said valve controls said speed regulating means to correct a tendency of the speed of said motor to depart from the predetermined relation between the speeds of said motor and said contact device.

4. In a system of speed control, an electric motor whose speed is apt to vary, speed regulating means for said motor, a plurality of thermionic valves, the said valves being connected to the armature winding of said motor to have a substantially uniform phase angle difference between the potentials impressed on the valves, a contact device operated at a substantially constant speed for controlling the energy which passes through said valves, and connections through which the energy which passes through said valves controls said speed regulating means to correct a tendency of the speed of said motor to depart from the predetermined relation between the speeds of said motor and said contact device.

5. In a speed control system, an electric motor whose speed is apt to vary, speed regulating means for said motor, thermionic means electrically connected with said motor, a contact device operated at a substantially constant speed for controlling the energy which passes through said thermionic means, connections through which the energy passing through said thermionic means controls said speed regulating means to maintain a predetermined ratio between the speeds of said motor and said contact device, and means for adjusting the speed of said contact device to vary the speed of said motor to be automatically maintained.

6. In a system for controlling the speed relation of a plurality of separate electric motors, speed regulating means for each of said motors, each of said motors having thermionic means electrically connected thereto for controlling the associated speed regulating means, a separate contact device electrically connected with each of said thermionic means for controlling the energy which passes through the thermionic means in accordance with the tendency to departure of the associated motor from the predetermined speed relation between said motor and said device, and means for simultaneously operating the said contact devices to maintain a predetermined speed relation of the motors.

7. In a system for determining and then maintaining an adjustable speed relation between a plurality of separate motors, speed regulating means for each of said motors comprising a plurality of thermionic valves electrically connected to the armature winding of the motor to have a substantially uniform phase angle difference between the potentials impressed on the valves, a contact device for controlling the energy which passes through the valves to effect a regulation of the speed of the associated motor, a common driving means for said contact devices for maintaining the predetermined speed relation of the motors, and means for adjusting the speeds of said contact devices to adjust the speed relation of the motors to be automatically maintained.

In witness whereof, I have hereunto set my hand this 22nd day of July, 1925.

DAVID C. PRINCE.